US012739916B2

(12) United States Patent
Agrawal et al.

(10) Patent No.: US 12,739,916 B2
(45) Date of Patent: Sep. 15, 2026

(54) MANAGING A USER EQUIPMENT CONNECTION TO A WIRELESS NETWORK

(71) Applicant: Skylo Technologies, Inc., Palo Alto, CA (US)

(72) Inventors: Meghna Agrawal, Cupertino, CA (US); Andrew Nuttall, Mountain View, CA (US); Soham Dhiren Desai, Palo Alto, CA (US); Anand Radhakrishnan, Espoo (FI); Vijay Lewis, Wylie, TX (US)

(73) Assignee: Skylo Technologies, Inc., Mountain View, CA (US)

( * ) Notice: Subject to any disclaimer, the term of this patent is extended or adjusted under 35 U.S.C. 154(b) by 413 days.

(21) Appl. No.: 18/106,535

(22) Filed: Feb. 7, 2023

(65) Prior Publication Data

US 2024/0040650 A1 Feb. 1, 2024

Related U.S. Application Data

(60) Provisional application No. 63/393,685, filed on Jul. 29, 2022.

(51) Int. Cl.
*H04W 88/06* (2009.01)
*H04W 76/16* (2018.01)

(52) U.S. Cl.
CPC ............ *H04W 76/16* (2018.02); *H04W 88/06* (2013.01)

(58) Field of Classification Search
CPC .............................. H04W 88/06; H04W 76/16
See application file for complete search history.

(56) References Cited

U.S. PATENT DOCUMENTS 5,915,217 A 6/1999 Wiedeman et al.
6,112,085 A 8/2000 Garner et al.
6,775,251 B1 8/2004 Wiedeman et al.
7,324,056 B2 1/2008 Wesel
7,477,597 B2 1/2009 Segal
8,532,059 B2 * 9/2013 George ............... H04W 36/302 370/310

(Continued)

FOREIGN PATENT DOCUMENTS

KR 20200062884 * 11/2018

OTHER PUBLICATIONS

KR 2020062884 Translated version (Year: 2018).*

*Primary Examiner* — Ayman A Abaza
*Assistant Examiner* — Van Ta Nguyen
(74) *Attorney, Agent, or Firm* — Brian R. Short

(57) ABSTRACT

Apparatuses, methods, and systems for managing a User Equipment (UE) connection to a wireless network are disclosed. One method includes attaching, by a core network, the UE to the wireless network, storing, by the core network, at least a first subset of an attach context and a UE operational data set, wherein the UE stores at least a second subset of the attach context in memory and network operational data sets, wherein the UE transmits packets using the second subset of the attach context and the network operational data sets. The method further comprises receiving, by the core network, the packets from the UE using the first subset of the attach context, and urging by the core network the first subset of the attach context based on the UE network operational data set.

20 Claims, 8 Drawing Sheets

(56) References Cited

U.S. PATENT DOCUMENTS

| | | | | |
|---|---|---|---|---|
| 8,831,014 | B2 * | 9/2014 | Koodli | H04L 12/1485 370/401 |
| 10,064,048 | B1 * | 8/2018 | Mui | H04W 8/26 |
| 11,228,952 | B2 * | 1/2022 | Ryoo | H04W 76/30 |
| 11,864,262 | B2 * | 1/2024 | Liu | H04W 12/0471 |
| 12,010,759 | B2 * | 6/2024 | Liu | H04W 76/27 |
| 12,245,320 | B2 * | 3/2025 | Nuggehalli | H04W 52/0225 |
| 2006/0030311 | A1 | 2/2006 | Cruz et al. | |
| 2012/0189016 | A1 * | 7/2012 | Bakker | H04W 76/11 370/401 |
| 2012/0302221 | A1 * | 11/2012 | Nader | H04W 48/18 455/418 |
| 2013/0195041 | A1 * | 8/2013 | Papasakellariou | H04L 1/1671 370/329 |
| 2016/0157278 | A1 * | 6/2016 | Casati | H04W 72/20 370/312 |
| 2018/0041901 | A1 * | 2/2018 | Yilmaz | H04W 60/005 |
| 2018/0234943 | A1 * | 8/2018 | Zakaria | H04W 68/02 |
| 2018/0279249 | A1 * | 9/2018 | Lv | H04W 48/10 |
| 2022/0279619 | A1 * | 9/2022 | Wu | H04W 12/106 |
| 2023/0054925 | A1 * | 2/2023 | Vivanco | H04W 76/19 |
| 2023/0156826 | A1 * | 5/2023 | Palermo | H04W 76/10 370/329 |
| 2023/0292388 | A1 * | 9/2023 | Hu | H04W 12/04 |
| 2023/0362704 | A1 * | 11/2023 | Edge | H04W 24/10 |

* cited by examiner

Figure 5:
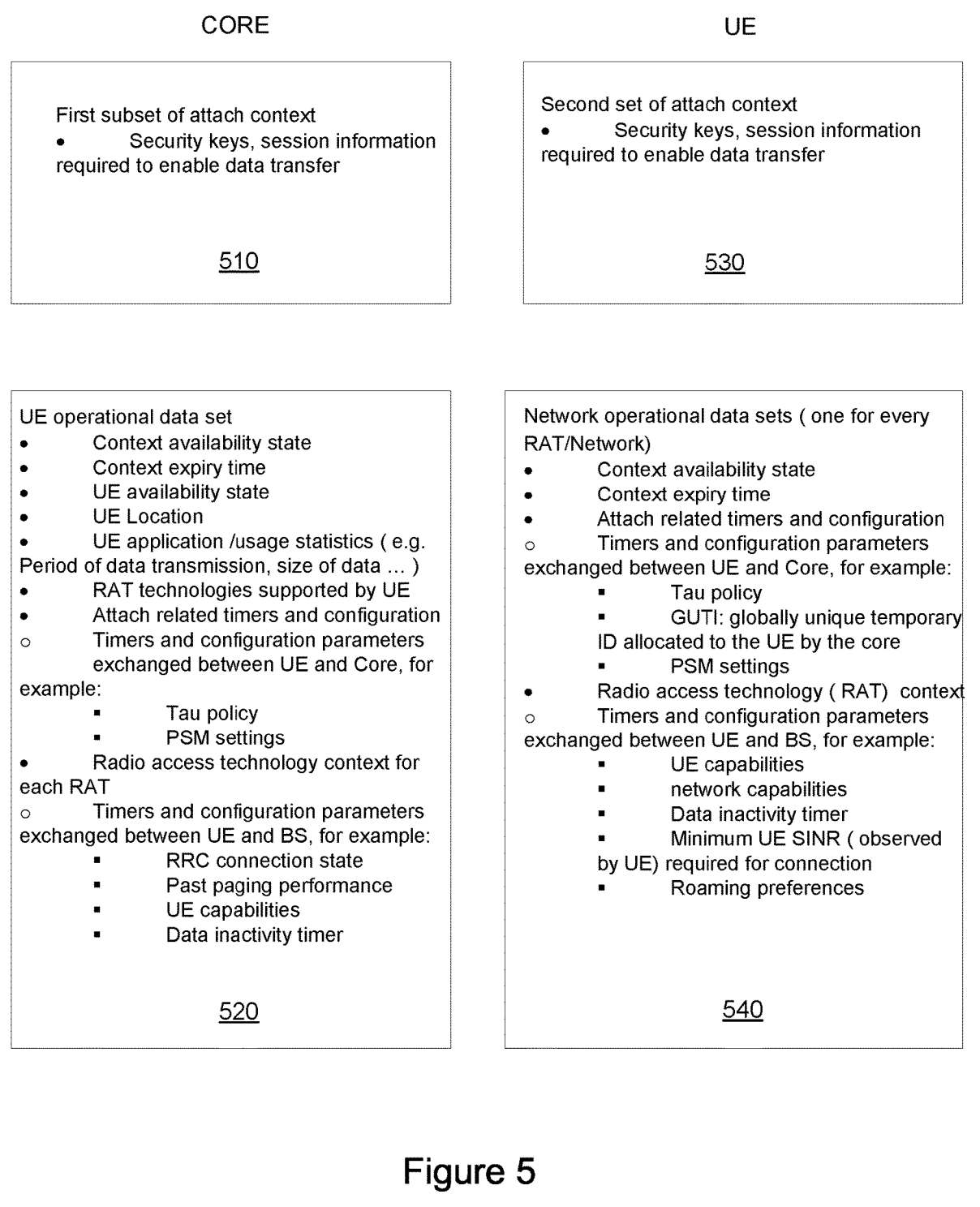

CORE

First subset of attach context
- Security keys, session information required to enable data transfer

510

UE

Second set of attach context
- Security keys, session information required to enable data transfer

530

UE operational data set
- Context availability state
- Context expiry time
- UE availability state
- UE Location
- UE application /usage statistics ( e.g. Period of data transmission, size of data … )
- RAT technologies supported by UE
- Attach related timers and configuration
  - Timers and configuration parameters exchanged between UE and Core, for example:
    - Tau policy
    - PSM settings
- Radio access technology context for each RAT
  - Timers and configuration parameters exchanged between UE and BS, for example:
    - RRC connection state
    - Past paging performance
    - UE capabilities
    - Data inactivity timer

520

Network operational data sets ( one for every RAT/Network)
- Context availability state
- Context expiry time
- Attach related timers and configuration
  - Timers and configuration parameters exchanged between UE and Core, for example:
    - Tau policy
    - GUTI: globally unique temporary ID allocated to the UE by the core
    - PSM settings
- Radio access technology ( RAT) context
  - Timers and configuration parameters exchanged between UE and BS, for example:
    - UE capabilities
    - network capabilities
    - Data inactivity timer
    - Minimum UE SINR ( observed by UE) required for connection
    - Roaming preferences

MANAGING A USER EQUIPMENT CONNECTION TO A WIRELESS NETWORK

RELATED PATENT APPLICATIONS

This patent application claims priority to U.S. Provisional Patent Application Ser. No. 63/393,685, filed Jul. 29, 2022, which is herein incorporated by reference.

FIELD OF THE DESCRIBED EMBODIMENTS

The described embodiments relate generally to wireless communications. More particularly, the described embodiments relate to systems, methods, and apparatuses for managing a User Equipment (UE) connection to a wireless network.

BACKGROUND

Current data networks are designed primarily for human users and the network and traffic characteristics that human users generate. The growth and proliferation of low-cost embedded wireless devices pose a new challenge of high volumes of low bandwidth devices vying for access to limited network resources. One of the primary challenges with these new traffic characteristics is the efficiency at which the shared network resources can be used. For common low bandwidth applications such as GPS tracking, the efficiency (useful/useless data ratio) can often be below 10%. This inefficiency is the result of large volumes of devices communicating in an uncoordinated environment. Addressing this problem is fundamental to the future commercial viability of large-scale network deployments.

It is desirable to have methods, apparatuses, and systems for managing a User Equipment (UE) connection to a wireless network.

SUMMARY

An embodiment includes a method of managing a User Equipment (UE) connection to a wireless network. The method includes attaching, by a core network, the UE to the wireless network, storing, by the core network, at least a first subset of an attach context and a UE operational data set, wherein the UE stores at least a second subset of the attach context in memory and network operational data sets, wherein the UE transmits packets using the second subset of the attach context and the network operational data sets. The method further comprises receiving, by the core network, the packets from the UE using the first subset of the attach context and purging by the core network the first subset of the attach context based on the UE operational data set.

Another embodiment includes a system that manages a User Equipment (UE) connection to a wireless network. The system includes a base station configured to facilitate a wireless satellite link between the UE and the wireless network, and a core network. For an embodiment, the core network is configured to attach the UE to the wireless network, and store at least a first subset of an attach context and a UE operational data set, wherein the UE is configured to store at least a second subset of the attach context in memory and network operational data sets and transmit packets using the second subset of the attach context and the network operational data sets. The core network is further configured to receive the packets from the UE using the first subset of the attach context and purge the first subset of the attach context based on the UE operational data set.

Other aspects and advantages of the described embodiments will become apparent from the following detailed description, taken in conjunction with the accompanying drawings, illustrating by way of example the principles of the described embodiments.

BRIEF DESCRIPTION OF THE DRAWINGS

FIG. 5 shows tables that include examples of information included within a first subset of an attach context, a second subset of the attach context, a User Equipment (UE) data set, and a network operational data set, according to an embodiment.

DETAILED DESCRIPTION

The embodiments described include methods, apparatuses, and systems for managing a User Equipment (UE) connection to a wireless network.

Figure 1:
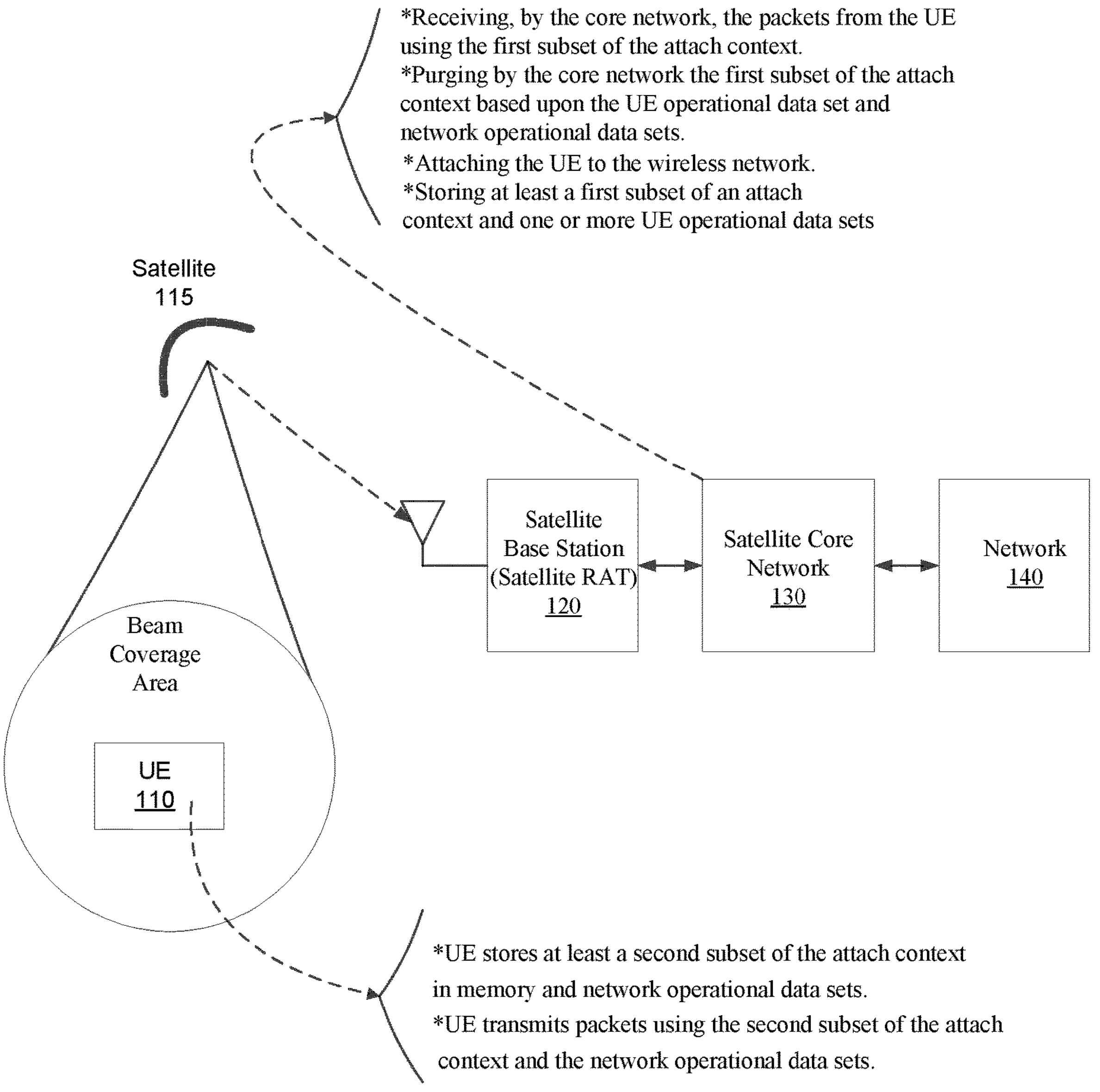
FIG. 1 shows a wireless network that manages a User Equipment (UE) connection to the wireless network that includes a satellite core network, according to an embodiment.

FIG. 1 shows a wireless network that manages a User Equipment (UE) 110 connection to the wireless network that includes a satellite core network 130, according to an embodiment. For an embodiment, when the UE 110 attaches to the wireless network, the core network 130 operates to store at least a first subset of an attach context and a UE operational data set. Further, the UE 110 operates to store at least a second subset of the attach context in memory and network operational data sets. When the UE is communicating through the wireless network, the UE transmits packets using the second subset of the attach context and the network operational data sets. The satellite core network 130 is configured to receive the packets from the UE using the first subset of the attach context. The satellite core network 130 is further configured to purge the first subset of the attach context based on the UE operational data set.

For an embodiment, the UE 110 wirelessly communicates with the wireless network through a satellite 115 and a satellite RAT of, for example, a base station 120 of the wireless network. The wireless network facilitates communication between the UE 110 and an upstream backbone network 140.

For an embodiment, the attach context (including the first subset and the second subset) includes information related to timers, configuration parameters, security keys, device (UE) identification (ID), network ID and other parameters required to establish and maintain network attachment of the UE 110 to the network. It is to be understood that the network attachment is a key process by which the UE 110 registers to the network, thereby allowing the subscriber of the UE 110 to initiate or accept incoming communication sessions through the wireless network.

For an embodiment, the UE operational data set includes an attach context expiry timer. For an embodiment, the attach context expiry timer times how long in which there is no communication between the UE and the wireless network. If the time of no communication exceeds the expiry time, the first subset of the attach content is purged. The expiry time can be set, for example, to 30 days. For an embodiment, the core network has a limited number of user licenses. For an embodiment, when the core network purges the first subset of attach context, a user license is released, thereby allowing another UE to use the released user license.

For at least some embodiments, the UE operational data set includes at least available UE radio access technology (RAT) protocols. Examples of available UE radio access technology protocols include satellite RAT, terrestrial NB-IOT (narrow band internet of things), terrestrial LTE CAT-M (Long term evolution, category machine). For at least some embodiments, the UE operational data set include at least a UE location. For at least some embodiments, the UE operational data set includes one or more of available UE radio access technology protocols, and UE application, UE Location and UE Location history, usage history.

For at least some embodiments, the network operational data sets include at least a minimum signal strength to initiate connection. For an embodiment, the minimum signal strength is a signal strength of wireless signals transmitted by the UE 110.

For an embodiment, the base station 120 of the wireless network broadcasts the value of minimum signal strength required for connection. For an embodiment, the UE 110 may also adjust the minimum signal strength based on its antenna performance, performance (data communication success/failure) of previous communication or based on recommendation from the base station 120.

For at least some embodiments, the network operational data sets include at least a minimum signal to interference ratio required to initiate connection. For an embodiment, the base station 120 of the wireless network broadcasts the value of minimum signal to interference ratio required for connection. For an embodiment, the UE 110 also adjusts the minimum signal to interference ratio based on its antenna performance, performance (data communication success/failure) of previous communications or based on a recommendation from the base station 120. For example, if the UE has poor antenna performance (below a threshold), then the UE 110 can increase the value of minimum signal to interference ratio required for uplink transmission. By updating minimum SINR, the UE 110 can improve the probability of success of uplink transmission. For an embodiment, the UE 110 can also adapt the minimum SINR value based on past RACH (random access channel) failures. For an embodiment, the minimum SINR value is chosen such that a RACH failure ratio is within an acceptable (selected) range.

For an embodiment, the network operational data sets include at least one of inactivity timers that time movement of the UE 110 from RRC connected to RRC idle state. That is, after a timing of inactivity of data communications between the UE 110 and the base station 120 of the wireless network greater than an inactivity timer, the UE 110 is converted from an RRC connected state to an RRC idle state. For an embodiment, the base station 120 sends an inactivity timer value and other configuration parameters and timer values to the UE 110 for which the first subset of attach context is not available at the satellite core network 130. After receiving the configuration and timer values from the base station 120, the UE 110 saves the configuration and timer values as part of the network operational dataset and uses the configuration and timer values for future communications with the base station 120.

For an embodiment, the network operational data sets include at least one of a minimum signal strength (from the UE 110 to the base station 120 of the wireless network) to initiate connection with the base station 120 of the wireless network), enabled roaming capabilities, PSM (Power Saving Mode) settings, inactivity timers, and/or radio resource control context. For an embodiment, the inactivity timer(s) are synchronized between the UE 110 and the base station 120 of the wireless network. For an embodiment, synchronization includes an inactivity timer at the UE 110 being determined by an inactivity timer saved within the UE operational data set at core network 130.

For an embodiment, network operational datasets include a radio access technology (RAT) context. For an embodiment, the RAT context includes the configuration parameters and timer values exchanged between the UE 110 and BS 120 at the time of an RRC connection establishment. This includes UE capabilities, network capabilities, data inactivity timer, minimum UE SINR (observed by the UE110) required for connection, and/or roaming preferences.

For an embodiment UE operational dataset include the radio access technology (RAT) context which includes the configuration parameters and timer values exchanged between the UE 110 and the base station 120 at the time of RRC connection establishment.

For an embodiment, the base station 120 sends the RAT timers and configuration parameters to UE (for example, data inactivity timer, drx configuration, minimum SINR etc.) only when the first subset of context is not available at core network (such as, the satellite core network 130). This is because the RAT timers and configuration parameters are available as part of network operational data sets corresponding to the RAT at the UE 110. This is advantageous because it helps in reducing the message size and number of messages required to establish RRC connection. Similarly, if the UE capabilities are already available at core network (such as, the satellite core network 130), then instead of sending a request to get UE capabilities from UE 110, the base station 120 can get the UE capabilities along with other RAT related parameters from the core network. Reducing the message size and the number of messages reduces wireless communication between the UE 110 and the wireless network, thereby saving valuable frequency spectrum.

For an embodiment, the core network 130 supports multiple radio access technologies (RATs). For an embodiment, at least one of the RATs is a wireless satellite network. For an embodiment, the attach context is used across the multiple RATs. For an embodiment, the attach context is used across the multiple RATs, which allows security keys to remain the same across the multiple RATs.

For an embodiment, the UE stores the network operational data sets for each of the multiple RATs. For example, the UE 110 can store the network operational datasets for both the terrestrial network and satellite network of the wireless network.

For an embodiment, the UE operational data set is updated through 3rd party applications. For example, for an embodiment, the 3rd party applications provide updates for UE capabilities, a data profile of the UE (such as, data usage), a UE location, and/or a UE chipset number/manufacturer identification. For an embodiment, the 3rd party applications can also indicate UE's availability status and whether UE is within terrestrial coverage area. Further, the 3rd party applications can also provide information about a radio performance for the UE. The radio performance of the UE can include, for example, an antenna performance, and/or availability of an LNA (Low noise amplifier).

Figure 2:
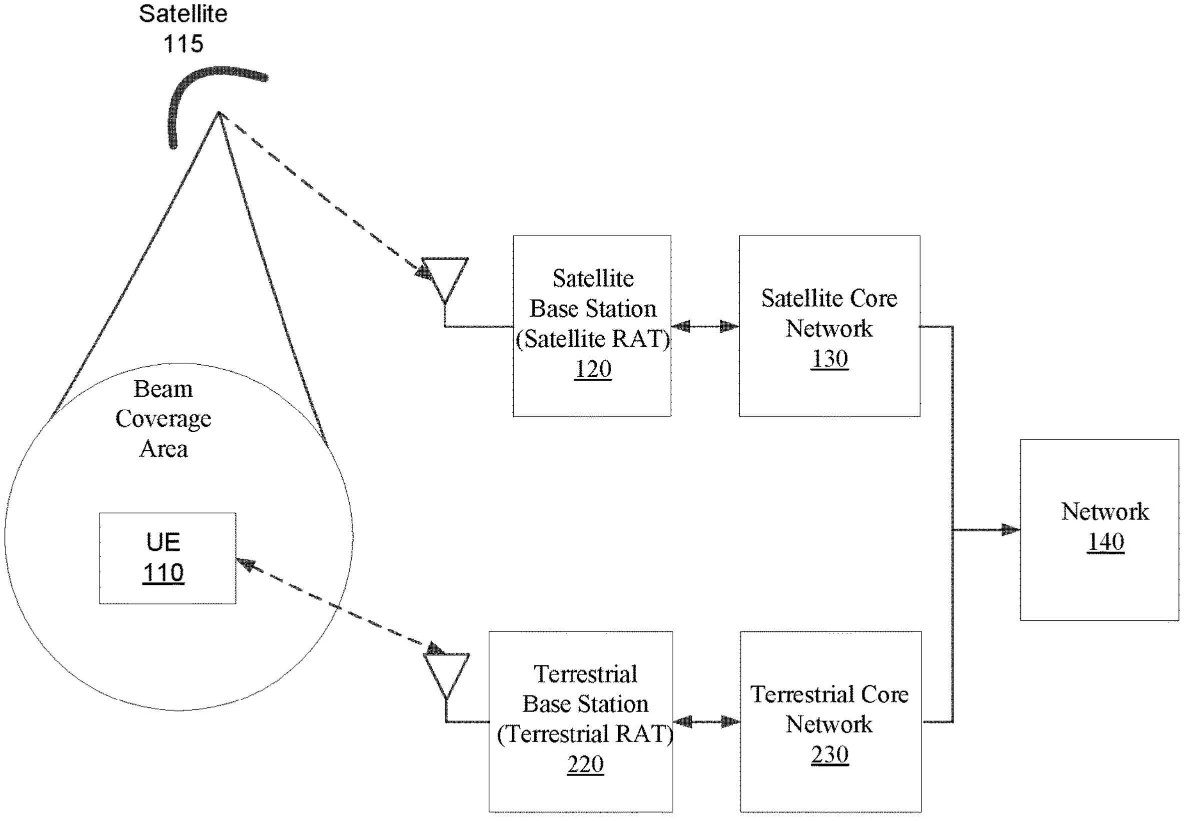
FIG. 2 shows a wireless network that manages a User Equipment (UE) connection to the wireless network that includes a joint satellite and terrestrial core network, according to an embodiment.

FIG. 2 shows a wireless network that manages a User Equipment (UE) connection to the wireless network that includes a terrestrial core network 230 and a satellite core network 130, according to an embodiment. For an embodiment, the UE 110 wirelessly communicates with the wireless network through the satellite 115 and the satellite RAT of the base station 120, or through a terrestrial antenna of a terrestrial RAT of a terrestrial base station 220. For this embodiment, the wireless network facilitates communication between the UE 110 and an upstream backbone network 140 through either the satellite base station 120 or the terrestrial base station 220. For this embodiment, the UE 110 maintains separate network operational data sets and second subset of attach contexts for both the terrestrial and satellite networks of the wireless network. When UE 110 connects to the network through the satellite base station 120, the UE 110 uses the separate network operational data sets of the satellite RAT and the second subset of attach context to encode the data and communicate with the wireless network.

For an embodiment, the UE 110 transmits packets using the second subset of the attach context and the network operational data sets. For an embodiment, satellite networks (including base station 120) and terrestrial networks (including base station 220) of the wireless network have different TAU (track area update) policies (tracking a geographical area in which the UE is located), and the UE 110 uses the policies based on the type of network the UE 110 is using for wirelessly connecting to the network. A reason for having different policies for terrestrial and satellite is to save the network resource (for example, wireless spectrum) usage and avoid redundant information transmission in the satellite network which has limited wireless resources (wireless spectrum) available.

Figure 3:
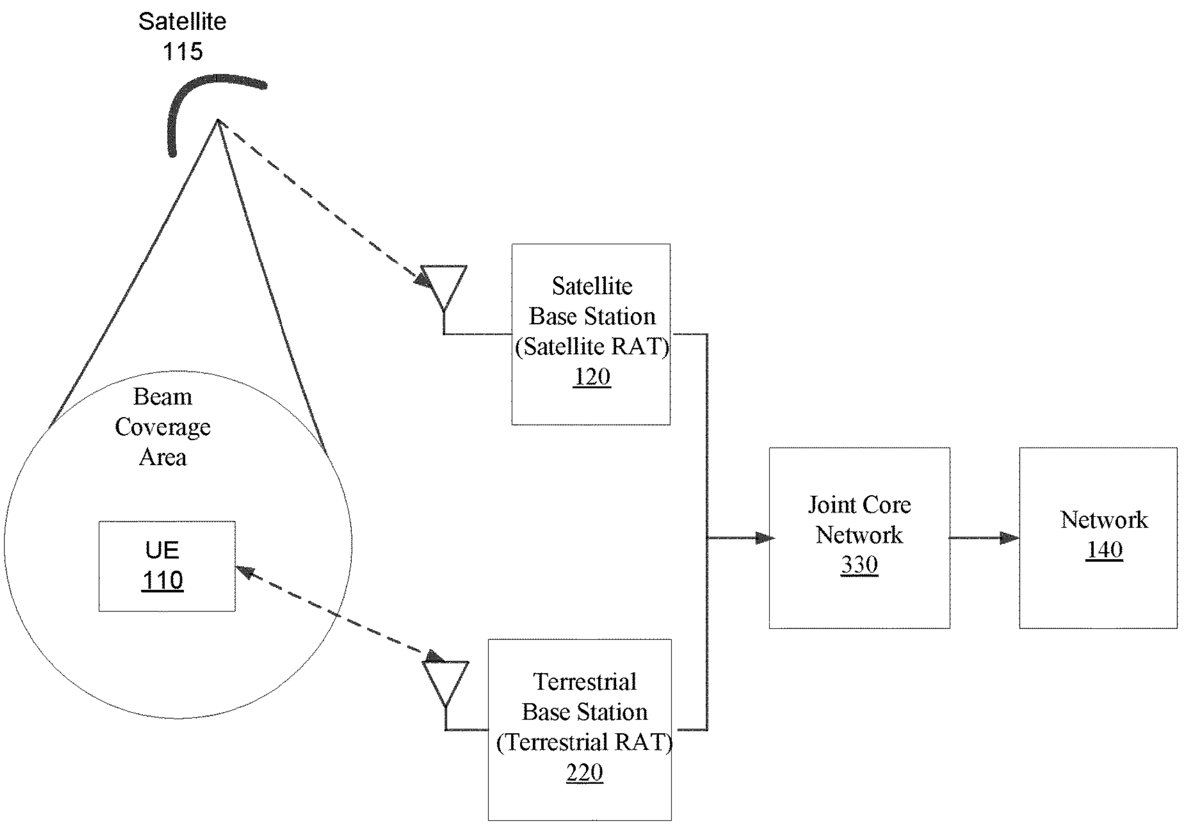
FIG. 3 shows a wireless network that manages a User Equipment (UE) connection to the wireless network that includes a terrestrial core network and a satellite core network, according to an embodiment.

FIG. 3 shows a wireless network that manages a User Equipment (UE) 110 connection to the wireless network that includes a joint satellite and terrestrial core network 330, according to an embodiment. For an embodiment, the UE 110 wirelessly communicates with the wireless network through the satellite 150, the satellite RAT of the base station 120 and the joint core network 330, or through a terrestrial antenna of a terrestrial RAT of a terrestrial base station 220 and the joint core network 330. For this embodiment, the wireless network facilitates communication between the UE 110 and an upstream backbone network 140 through either the satellite base station or the terrestrial base station.

For an embodiment, when terrestrial and satellite networks of the wireless network include the joint core network 330, the UE 110 attaches first using terrestrial network (terrestrial base station 220). Further, the UE 110 saves the second subset of attach context and network operational datasets and uses the second subset of attach context and network operational datasets to enable data communication either through the terrestrial network (terrestrial base station 220) or the satellite network (satellite base station 120). For an embodiment, when UE110 attaches with the joint core network 330, the joint core network 330 sends an 'attach accept' message along with the network parameters, policies and timer values for both terrestrial as well as satellite RAT. For an embodiment, the UE saves the terrestrial parameters along with the terrestrial network operational data set and satellite related parameters with the satellite network operational dataset. For an embodiment, the joint core network 330 uses the availability state of the UE 110 to route downlink messages either to the terrestrial RAT of the terrestrial base station 220 or the satellite RAT of the satellite base station 120.

Purging the First Subset of the Attach Context

As previously described, for an embodiment, the core network purges the first subset of the attach context based on the UE configuration data sets and network operational data sets. For an embodiment, purging by the core network of the first subset of the attach context is based on the last reported location of the UE. For an embodiment, the core network purges the first subset of the attach context when the UE is out of coverage area of the wireless network for more than a threshold duration of time. For an embodiment, the core network purges the first subset of the attach context when the UE does not connect to the wireless network for more than a selected number of days, such as, 15 days. For an embodiment, the core network purges the first subset of the attach context when the UE is located in an area (location) where service is banned/not allowed. For an embodiment, the core network purges the first subset of the attach context when the UE has not connected to the wireless network for more than a selected number of days, such as, 30 days even if the UE is within a coverage area of the wireless network.

For an embodiment, the first subset of attach context includes an attach context expiry timer. For an embodiment, the expiry timer times how long in which there is no communication between the UE and the wireless network. If the time of no communication exceeds the expiry time, the first subset of the attach content is purged. The expiry time can be set, for example, to 30 days.

Figure 4:
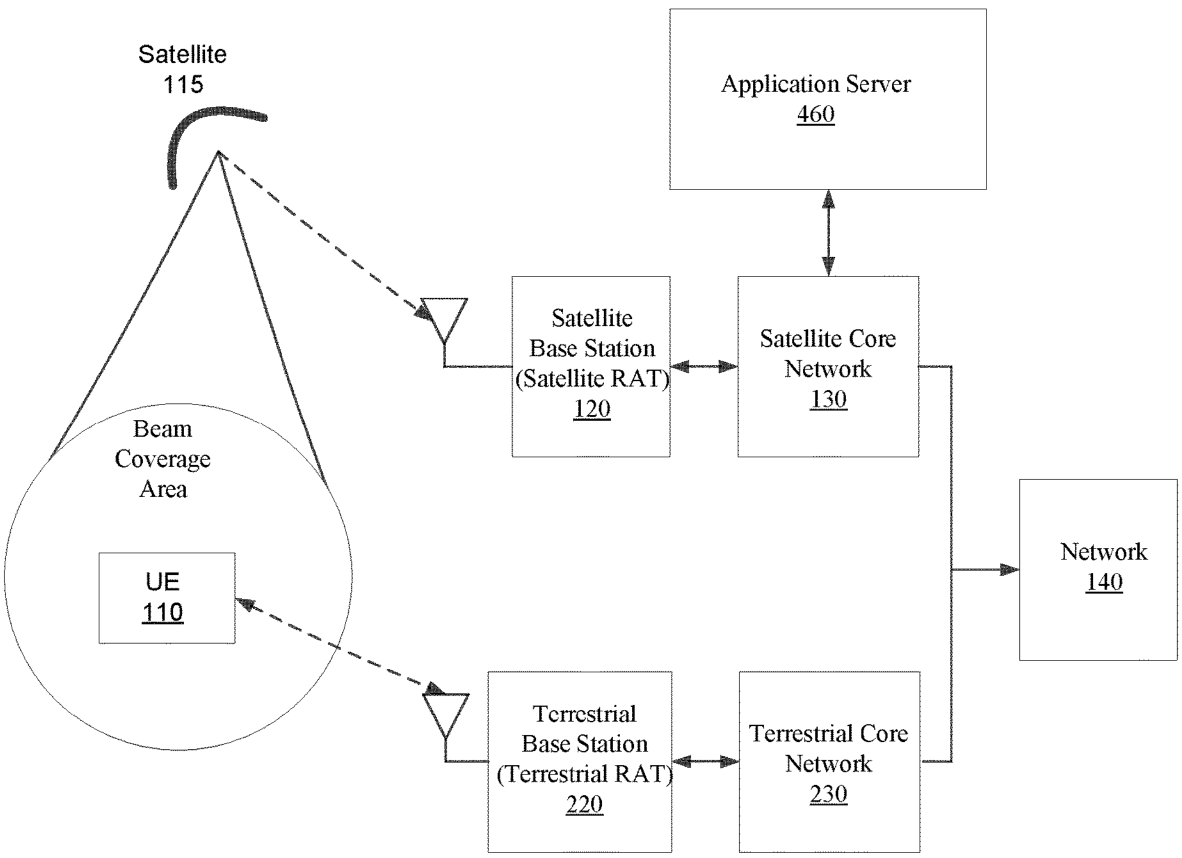
FIG. 4 shows a wireless network that manages a User Equipment (UE) connection to the wireless network that includes an application server, according to an embodiment.

FIG. 4 shows a wireless network that manages a User Equipment (UE) connection to the wireless network that includes an application server 460, according to an embodiment. For an embodiment, the purging by the core network 130 of the first subset of the attach context is based on data received from other networks through the application server 460. The application server 460 can direct purging of the first subset of the attach context for various reasons. For an embodiment, the application server 460 directs purging of the first subset of the attach context because a data quota of the UE is full and a re-subscription time of the user of the UE has expired. For an embodiment, the application server directs purging of the first subset of the attach context because the application server has determined that the UE is a rogue device that is not following certification rules. For an embodiment, the application server directs purging of the first subset of the attach context because there have been too many unsuccessful connection attempts observed for the UE. For an embodiment, the application server directs purging of the first subset of the attach context because the UE is in an area where service is not available.

UE Availability

For an embodiment, the UE operational data set includes a UE availability state wherein packets are routed based on the UE availability state. For an embodiment, the routing determined by the UE availability state is downstream routing from a device connected to the network 140 through the wireless network to the UE 110. That is, for example the UE availability state may indicate that the UE is available via satellite only, via terrestrial RAT 1, via terrestrial RAT2, unknown etc. The downstream routing to the UE 110 is through the terrestrial or satellite core depending on which has UE availability, which can provide the desired connection.

For an embodiment, the UE availability state indicates UE's current and previous connectivity information of the UE 110. Possible values of UE availability state include the UE reachable via satellite network only, the UE reachable via terrestrial network RAT1, the UE reachable via terrestrial network RAT2, the current reachability of the UE is unknown, the last reachability time and network (terrestrial or satellite) of the UE, wherein the RAT1 and the RAT 2 can be two terrestrial RAT technologies or networks.

For an embodiment, the core (such as, the satellite core network 130) sets the UE availability state to available when the UE connects to the network and to unavailable when the UE sends a detach request. For an embodiment, the core network (such as, satellite core network 130, or the joint core network 330) stores and maintains the UE location and an active RAT (radio access technologies), wherein the active RAT is the RAT currently being used by the UE to access the network. For at least some embodiments, the attach context includes attach contexts for multiple terrestrial and satellite networks. However, for an embodiment, while transmitting a packet to the UE by the core network (downlink packet transmission), the core network knows the current location and active network of the UE. In order to support this, UE operational dataset includes the UE's current active network and the RAT interface used for latest communication with UE. If the current active network is a terrestrial network, then the core network transmits packets using the attach context corresponding to the terrestrial network, and if the current active network is the satellite network, then the core network uses the RAT attach context corresponding to satellite network for transmitting packet to the UE.

When terrestrial network is not available, UE uses satellite network and active RAT is set to satellite.

For an embodiment, the stored first subset of the attach context is unaffected by the UE availability state status. Prior art networks delete the attach context when the UE becomes unavailable and sends a detach request.

For an embodiment, when both satellite and terrestrial networks are available to UE, the UE uses the terrestrial network for communication and sets active RAT to the terrestrial network. FIG. 5 shows tables that include examples of information included within a first subset 510 of an attach context, a second subset 530 of the attach context, a user equipment (UE) operational data set 520, and a network operational data set 540, according to an embodiment.

For at least some embodiments, the first subset 510 of attach context and second subset 530 of attach context includes security keys and session information required to enable data transfer. For an embodiment, availability of first and second subset of attach contexts indicates that the UE has already completed Authentication and NAS (Non Access Stratum) Security procedures. For an embodiment, it is assumed that all future communications with the UE are encrypted and integrity protected. For an embodiment, the UE is identified by a unique IMSI (international mobile subscriber identity) or an IMEI (International Mobile Equipment Identity) number.

FIG. 5 shows many different parameters that can be included within the UE operational data set 520 and the network operational data sets 540.

Figure 6:
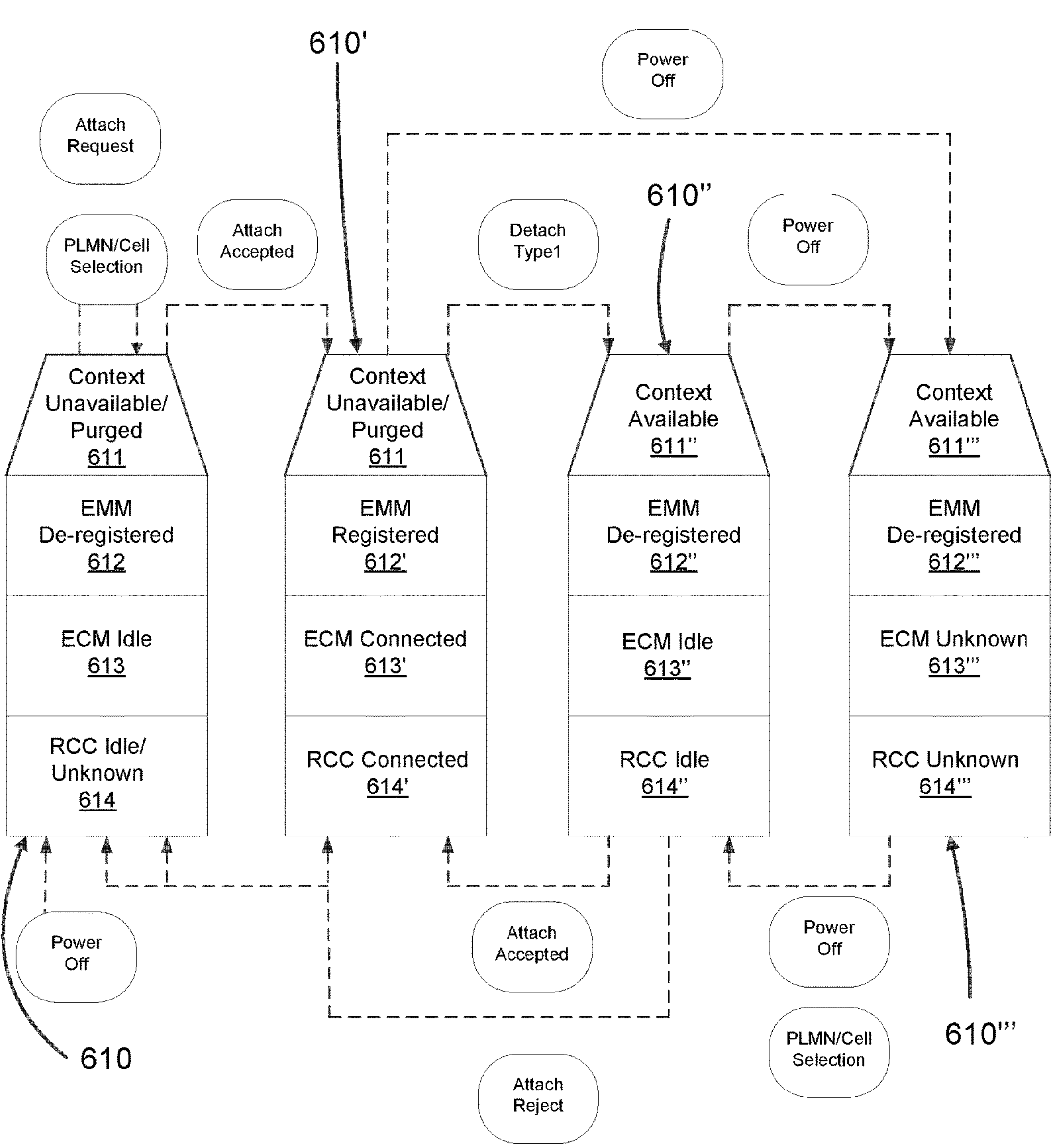
FIG. 6 shows various states maintained by satellite or terrestrial core networks and a base station, according to an embodiment.

FIG. 6 shows various states maintained by satellite or terrestrial core networks and a base station, according to an embodiment. The different states include a context availability state (611), an EMM registration state (612), an ECM connection state (613), and an RRC connectivity state (614). The states 610, 610', 610", 610'" show the multiple states having different values and possible transitions between the values. For an embodiment, the RRC connection states (614. 614', 614", 614'") indicate the state of radio resource control connection between base station and UE. For an embodiment, the values of RRC connection states (614) includes an RRC Idle 614", an RRC connected state 614', and an RRC unknown state 614", and an RCC idle/unknown state 614, which are maintained by the base station. The ECM (EPS connectivity management) connection state (613) and EMM (EPS Mobility management) registration state (612) are maintained by the core network. The values of ECM connection state (613) include an ECM Idle 613, 613', an ECM connected 613', and an ECM Unknown state 613'. The ECM Idle state 613, 613' indicates that the context for the UE for connection between base station and core network is not established, and ECM connected state 613' indicates that context of the UE for connection between base station and core network is established. The values of EMM registration state (612) include an EMM registered 612, 612' and an EMM deregistered 612", 612'". The EMM registered state 612, 612' indicates that the UE is attached to the wireless network, the data path is established, and the core network knows the location of the UE. For an embodiment, the UE location can also be stored as tracking area code of the cell where the UE is located.

For an embodiment, in addition to the ECM states 613 and the EMM states 612, the core network maintains an additional state 'context availability state' (611) to indicate the availability of the first subset of the attach context. The values of 'context availability state' (611) include context available 611", 611'", context unavailable and context purged 611, 611'. The 'Context available' 611", 611'" indicates that the first subset of attach context and the session information required for data transfer from/to UE is available. The 'context unavailable/purged' 611, 611' indicates that the first subset of attach context and session required for data transfer is unavailable or deleted by the core network.

For an embodiment, when UE attaches to the core network and the attach process between core network and UE is completed, the core network saves the first subset of attach context and updates the EMM Registration 612 and context availability state 611. For an embodiment, the UE saves the second subset of attach contexts in its memory or SIM memory. For an embodiment, the UE maintains the second set of attach context even if it power's off or becomes unavailable for a long duration.

For an embodiment, after first attachment, if the UE becomes unavailable or if the core network receives a detach request of type 1 (to be defined), then the core network maintains the saved first subset of attach context and sessions required for data transfer. This helps in skipping the attachment process when the UE powers on or becomes available again. When the UE powers on, for an embodiment, the UE can initiate data transfer using the saved second subset of attach context. Since core network state is still 'context available', re-attachment is not required. This helps in saving radio resources and reduces communication latency.

For an embodiment, if the core network receives a detach request of type 2 (to be defined), then the core network releases the context, deletes the sessions required for data transfer and updates the state to 'context unavailable'. In addition, if the core network receives a purging request or if a TAU timer expires then also the core network updates its state to context unavailable.

Detach Request of Type 1 and Type 2

For an embodiment, the type 1 detach request indicates that the UE is allowed in the wireless network and the type 2 detach request indicates that the UE is not allowed in the wireless network. Detach requests with cause code ""EPS Services Not Available", "Roaming Not Allowed in this TA" and "Illegal UE" are considered Type2 detach requests. The detach requests with most other cause codes are considered Type 1 detach requests.

For an embodiment, after first attachment with the satellite core network, if the UE powers off or becomes unavailable, the UE need not send a detach request to the satellite core network. The detach request takes extra radio resources, and therefore, is not recommended in a satellite network. The core network maintains the availability state of UE and in the absence of a 'detach request' message from UE, the core network can self-discover the unavailability of the UE and update its state. Similarly, for an embodiment, if the UE moves to another network, the UE is not expected to send a detach request to the satellite core network before moving to another network.

For an embodiment, the transmission of detach requests by the UE should be enabled/disabled by using a command by a user application or by the base station. This feature is specifically useful for IOT (internet of things) devices which are used for uplink data communications only.

For an embodiment, when the satellite core network receives a detach request from the UE, satellite core network need not send a detach accept message to the UE, and the UE does not retransmit the detach request if the UE doesn't receive the detach accept message from core network.

For an embodiment, when two-way data communication is expected between the UE and external applications, the UE sends a message to the base station when the UE is powering off or becoming unavailable. For an embodiment, this message is a short message indicating the reason for unavailability. For an embodiment, the base station informs the core network about unreachability of the UE.

For an embodiment, the satellite core network periodically checks for activity of the UE on the satellite network and if the UE is not active for more than a threshold time (for example, 30 days) the satellite core network detaches the UE from the wireless network, release the context of the UE and update the state of the UE to 'context unavailable'. This process optimizes the compute resources used by the core network.

For an embodiment, if the UE is a roaming/hybrid device, then while moving between the terrestrial network and the satellite network, the UE stores the second subset of the attach context for the terrestrial and another second subset of the attach context for the satellite network.

At least some prior wireless network implementations delete the context as the number of active contexts determines the number of licenses which are in use. Therefore, in order to optimize the number of licenses used, the core network deletes the context. Further, the next time when the UE wants to send a packet to the satellite network, the UE first re-attaches to the wireless network and then starts data transmission. The core network re-stores the context when UE re-attaches with the satellite network. Therefore, the old context is not of any use to the satellite core network and the satellite core network need not to maintain the context of the UE in the memory of the satellite core network.

Figure 7:
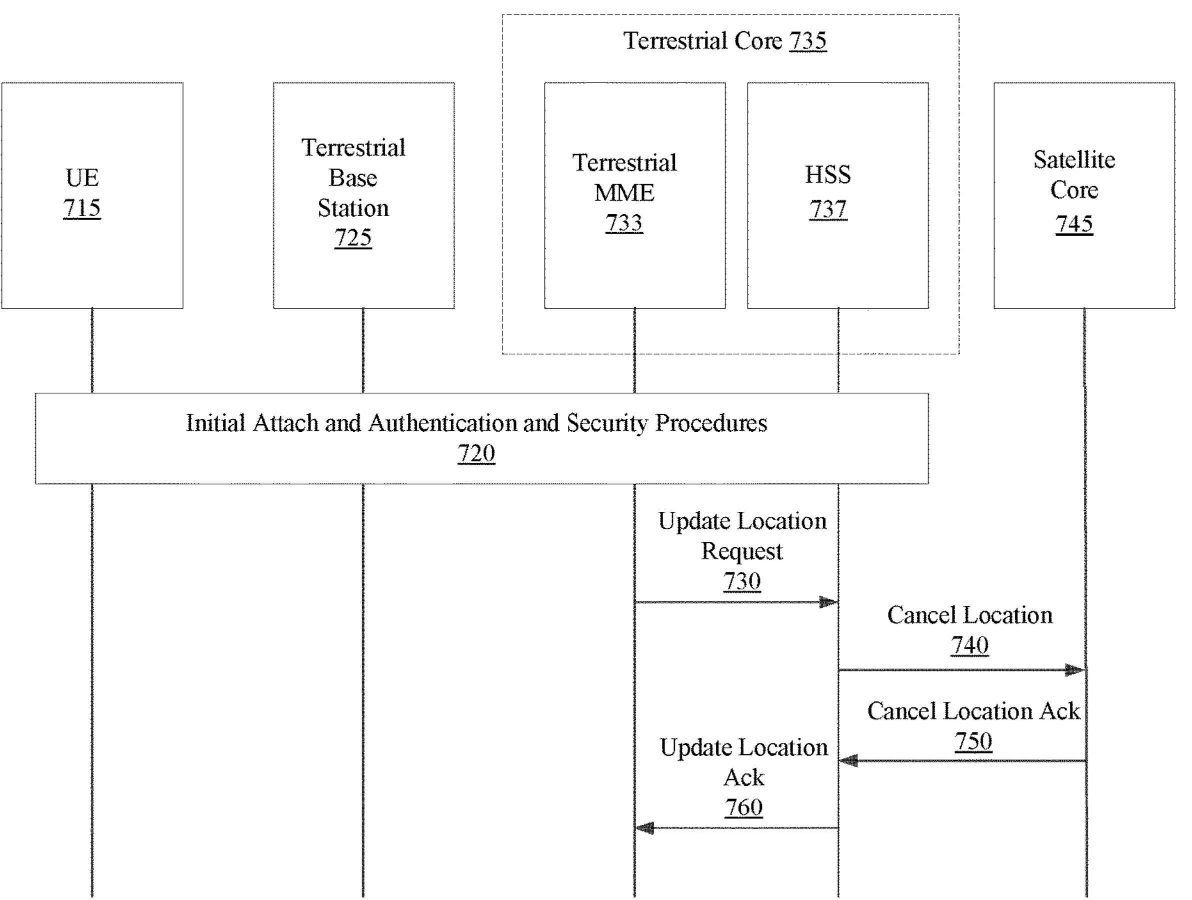
FIG. 7 shows an attachment process when a UE roams from a satellite network to a terrestrial network, according to an embodiment.

FIG. 7 shows an attachment process when a UE 715 roams from a satellite network to a terrestrial network, according to an embodiment. For an embodiment, when the UE 715 roams from the satellite network to the terrestrial network of the wireless network, the UE 715 attaches with the terrestrial base station 725 of the terrestrial network and completes authentication and security procedures 720. For an embodiment, while connecting with the terrestrial network, the UE 715 maintains the second subset of attach context for the satellite network. For an embodiment, after attachment completion, a terrestrial MME (mobility management entity) 733 component of a terrestrial core network 735 sends a location update request 730 to an HSS (home subscriber server) 737 of the terrestrial core network 735. For an embodiment, the HSS 737 sends a 'cancel location' request 740 to the satellite core network 745 indicating that UE 715 is within range (can wirelessly communicate) with the terrestrial network. After receiving a cancel location request, the satellite core network 745 updates the 'LIE availability state' to indicate the current location of the UE 715. However, the satellite core network maintains the 'first subset of attach context' and sessions required to enable data transfer between UE 715 and satellite core network 745, and keeps the state as 'context available'. For an embodiment, the satellite core network 745 sends a 'cancel location Ack' 750 back to the HSS 737 of the terrestrial core network 735 indicating that the satellite core network has updated the availability state of the UE 715. The HSS 737 then sends an update location acknowledgment 760 to the terrestrial MME 733.

For an embodiment, the UE operational data sets include a UE availability state, wherein packets are routed based on the UE availability state. For an embodiment, the core network sets the UE availability state to available when the UE connects to the network and to unavailable when the UE sends a detach request.

For an embodiment, the UE availability state is used by the satellite core network for routing downlink packets received by the satellite core network for the UE. If the UE is reachable via the terrestrial network, the satellite core network rejects the data transmission request and forwards the message to the terrestrial network for transmission. If UE is not reachable via the terrestrial or the satellite network, then the UE can set its availability state to unknown. For an embodiment, in this case, the core network sends a paging request to the UE based on the last connected network and historical connectivity information of the UE. Alternatively, for an embodiment, the core network also follows the terrestrial first policy, where the core network can first send the packet to the terrestrial network, and if that fails, the core network attempts to send the message via the satellite network.

For an embodiment, the satellite core network updates the UE availability state to 'UE's reachability unknown' when the satellite core network receives a detach request from the UE or if it's marked as unreachable via the base station of the satellite network, and the satellite core network updates its value to 'UE reachable via terrestrial network' when UE communicates via terrestrial network and satellite core network receives a 'cancel location request' from terrestrial network's HSS. For an embodiment, the context availability state and the session information is unaffected by the availability state of the UE.

For an embodiment, when the UE loses the connection to the terrestrial network, and moves back to the satellite network, the UE can use the saved second set of attach context to start data communication with the satellite network. For an embodiment, the UE need not to re-attach with the satellite core network since attach context is available at both the UE and the core network. For an embodiment, sessions required for data transfer between core network and UE are already available.

For an embodiment, the UE deletes the second subset of attach context for the satellite network, when the US is not allowed to operate on the satellite network or when the UE deletes the PLMN (public land mobile network) Id of the satellite network.

Figure 8:
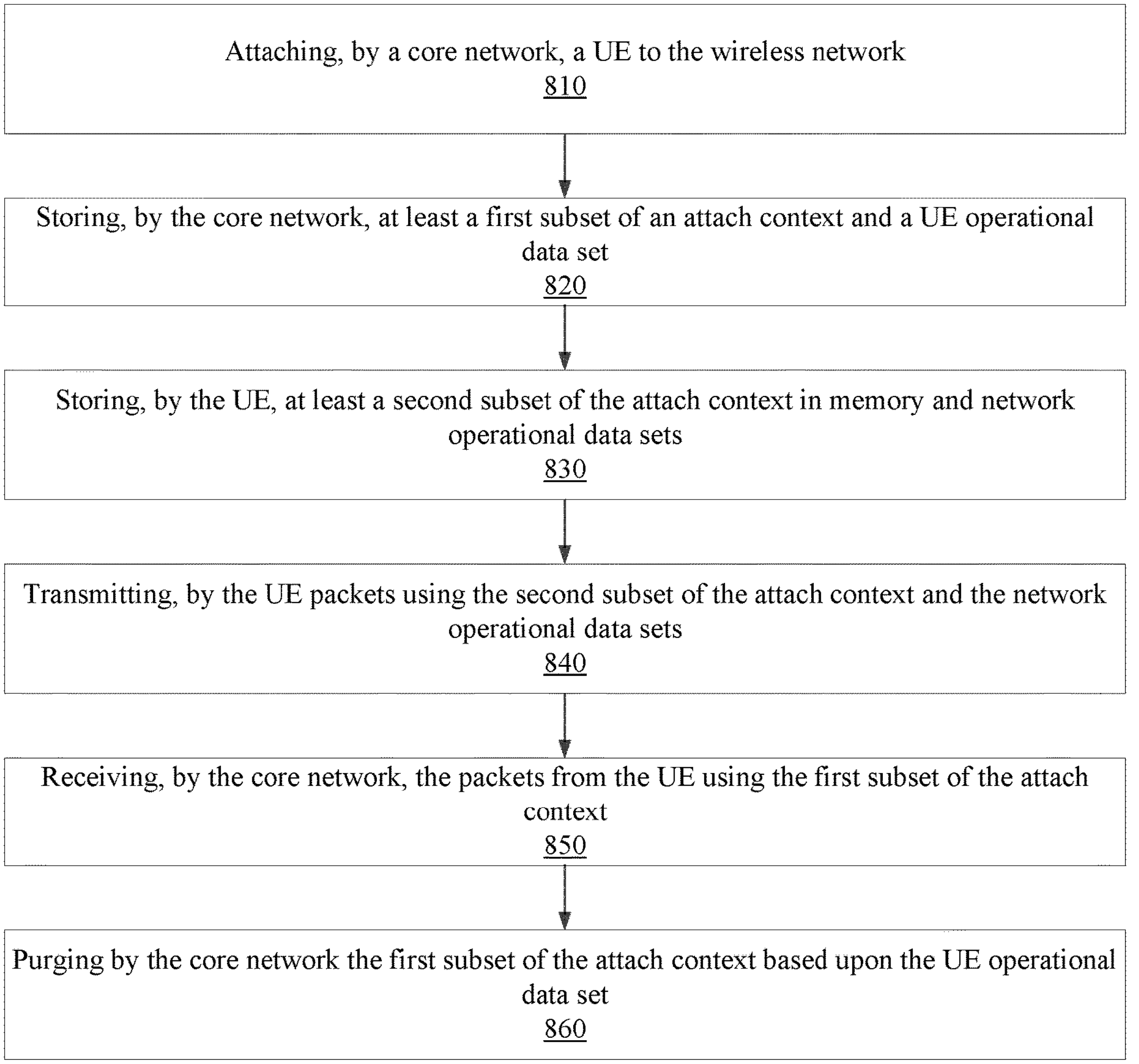
FIG. 8 is a flow chart that includes steps of a method of managing a User Equipment (UE) connection to the wireless network, according to an embodiment.

FIG. 8 is a flow chart that includes steps of a method of managing a User Equipment (UE) connection to the wireless network, according to an embodiment. A first step 810 includes attaching, by a core network, the UE to the wireless network. A second step 820 includes storing, by the core network, at least a first subset of an attach context and a UE operational data set. A third step 830 includes storing, by the UE, at least a second subset of the attach context in memory and network operational data sets. A fourth step 840 includes transmitting, by the UE, packets using the second subset of the attach context and the network operational data sets. A fifth step 850 includes receiving, by the core network, the packets from the UE using the first subset of the attach context. A sixth step 860 includes purging by the core network the first subset of the attach context based on the UE operational data set.

As previously described, for an embodiment, the UE operational data set includes at least available UE radio access technology protocols. For an embodiment, the UE operational data set include at least a UE location and UE RAT capabilities.

As previously described, for an embodiment, the core network supports multiple radio access technologies (RATs). As previously described, for an embodiment, the attach context is used across the multiple RATs, thereby allowing security keys to remain the same across the multiple RATs. As previously described, for an embodiment, the core network sets the UE availability state to available when the UE connects to the network and to unavailable when the UE sends a detach request. For an embodiment, the UE availability state is set to unavailable when the UE sends a detach request or when the UE communicates through another network. For an embodiment, the core network sets the UE availability state to 'reachable via terrestrial network' when the UE is within range of a terrestrial network, or a satellite core of the core network receives a 'cancel location' request from a terrestrial core network indicating that the UE has established connection via the terrestrial network.

As previously described, for an embodiment, the stored first subset of the attach context is maintained independent of the UE availability state status. As previously described, for an embodiment, the stored first subset of the attach context is maintained even when the satellite core receives a cancel location request from the terrestrial core network.

As previously described, for an embodiment, the network operation datasets include a network operational data set for each RAT of multiple RATs, and wherein the UE stores the network operational data set for each of the multiple RATs.

As previously described, for an embodiment, the purging by the core network of the first subset of the attach context is based on the last reported location of the UE. As previously described, for an embodiment, the purging by the core network of the first subset of the attach context is based on data received from other networks through an application server.

As previously described, for an embodiment, the UE operational data set includes an attach context expiry timer. As previously described, for an embodiment, the UE operational data set is updated through 3rd party applications. As previously described, for an embodiment, the UE operational data set include a UE availability state, a current active network, and a current active RAT, wherein packets are routed based on the UE availability state, the current active network, and the current active RAT. As previously described, for an embodiment, the network operational data sets include at least UE capability and RAT (radio access technologies) dependent parameters. For an embodiment, the UE capability information is exchanged between UE and a base station of the wireless network during RRC (Radio Resource Control) connection establishment. For an embodiment, the RAT dependent parameters include radio access control timers and configuration parameters. For an embodiment, the network operational data sets include at least a minimum signal strength to initiate connection and the UE further updates the minimum signal strength based on previous unsuccessful attempts to connect to the wireless network and based on antenna parameters. For an embodiment, the network operational data sets include at least inactivity timers, wherein the inactivity timers time inactivity of wireless communication between the UE and a base station of the wireless network, wherein on expiration of at least one inactivity time the UE is moved from an RRC (Radio Resource Control) connected state to an RRC (Radio Resource Control) idle state. For an embodiment, the network operational data sets include a UE temporary identifier assigned by a base station of the wireless network for the UE.

Although specific embodiments have been described and illustrated, the embodiments are not to be limited to the specific forms or arrangements of parts so described and illustrated. The described embodiments are to only be limited by the claims.

What is claimed:

1. A method of managing a user equipment (UE) connection to a wireless network that includes a satellite network that includes a satellite base station and a satellite core network, and a terrestrial network that includes a terrestrial base station and a terrestrial core network, comprising:

attaching, by the satellite core network, the UE to the wireless network;

storing, by the satellite core network, at least a first subset of an attach context and a UE operational data set;

wherein the UE stores at least a second subset of the attach context in memory and network operational data sets;

roaming, by the UE, from the satellite network to the terrestrial network comprising:

attaching, by the UE, with the terrestrial base station of the terrestrial network, and completing authentication and security procedures;

maintaining, by the UE, the second subset of the attach context for the satellite network while connecting with the terrestrial network;

sending, by a terrestrial MME (mobility management entity) component of the terrestrial core network, a location update request to an HSS (home subscriber server) of the terrestrial core network;

sending, by the HSS, a cancel location request to the satellite core network indicating that UE is within range with the terrestrial network;

updating, by the satellite core network, a UE availability state to indicate the current location of the UE after receiving a cancel location request;

wherein downstream routing of packets from the wireless network to the UE is through the terrestrial network or the satellite network based on the UE availability state, wherein the UE availability state indicates that the UE is available through the satellite network or the terrestrial network;

maintaining by the satellite core network, the first subset of the attach context and sessions required to enable data transfer between UE and the satellite core network, and keeping a state as context available;

sending, by the satellite core network, a cancel location acknowledgement back to the HSS of the terrestrial core network indicating that the satellite core network has updated the UE availability state;

sending, by the HSS, an update location acknowledgment to the terrestrial MME;

wherein the UE transmits packets to the satellite base station through a satellite using the satellite attach context and the satellite network operational data set, and the UE transmits packets to the terrestrial base station using a terrestrial attach context and the terrestrial network operation data set; and receiving, by the satellite core network, the packets from the UE using the first subset of the attach context.

2. The method of claim 1, wherein the UE operational data set includes at least available UE radio access technology protocols.

3. The method of claim 1, wherein the satellite core network supports multiple radio access technologies (RATs), and wherein the attach context is used across the multiple RATs, thereby allowing security keys to remain the same across the multiple RATs.

4. The method of claim 1, wherein the satellite core network supports multiple radio access technologies (RATs), and wherein network operation datasets include a network operational data set for each RAT of the multiple RATs, and wherein the UE stores the network operational data set for each of the multiple RATs.

5. The method of claim 1, wherein purging by the satellite core network of the first subset of the attach context is based on a last reported location of the UE.

6. The method of claim 1, wherein the UE operational data set includes an attach context expiry timer.

7. The method of claim 1, wherein purging by the satellite network of the first subset of the attach context is based on data received from other networks through an application server.

8. The method of claim 1, wherein the UE operational data set includes a UE availability state, a current active network, and a current active RAT, wherein packets are routed based on the UE availability state, the current active network, and the current active RAT.

9. The method of claim 8, wherein the satellite core network sets the UE availability state to ‘reachable via terrestrial network’ when the UE is within range of a terrestrial network of the wireless network, or a satellite core of the satellite core network receives a ‘cancel location’ request from the terrestrial core network indicating that the UE has established connection via the terrestrial network.

10. The method of claim 1, wherein the network operational data sets include at least UE capability and RAT (radio access technologies) dependent parameters.

11. The method of claim 1, wherein the UE operational data set includes at least a UE location and UE RAT capabilities.

12. The method of claim 1, wherein the network operational data sets include at least a minimum signal strength to initiate connection and UE further updates the minimum signal strength based on previous unsuccessful attempts to connect to the wireless network and based on antenna parameters.

13. The method of claim 1, wherein the network operational data sets include at least inactivity timers, wherein the inactivity timers time inactivity of wireless communication between the UE and a base station of the wireless network, wherein on expiration of at least one inactivity time the UE is moved from an RRC (Radio Resource Control) connected state to an RRC (Radio Resource Control) idle state.

14. A system that manages a User Equipment (UE) connection to a wireless network that includes a satellite network that includes a satellite base station and a satellite core network, and a terrestrial network that includes a terrestrial base station and a terrestrial core network, comprising:

the satellite base station and the terrestrial base station each configured to facilitate a wireless satellite link between the UE and the wireless network;

a satellite core network configured to:

attach the UE to the wireless network;

store at least a first subset of an attach context and a UE operational data set;

wherein the UE is configured to:

store at least a second subset of the attach context in memory and network operational data sets roam from the satellite network to the terrestrial network comprising the UE being configured to:

attach with the terrestrial base station of the terrestrial network, and completing authentication and security procedures;

maintain the second subset of the attach context for the satellite network while connecting with the terrestrial network;

wherein a terrestrial MME (mobility management entity) component of the terrestrial core network is configured to send a location update request to an HSS (home subscriber server) of the terrestrial core network;

wherein the HSS is configured to send a cancel location request to the satellite core network indicating that UE is within range with the terrestrial network;

wherein the satellite core network is further configured to:

update a UE availability state to indicate the current location of the UE after receiving a cancel location request;

wherein downstream routing of packets from the wireless network to the UE is through the terrestrial network or the satellite network based on the UE availability state, wherein the UE availability state indicates that the UE is available through the satellite network or the terrestrial network;

maintain the first subset of the attach context and sessions required to enable data transfer between UE and the satellite core network, and keeping a state as context available;

send a cancel location acknowledgement back to the HSS of the terrestrial core network indicating that the satellite core network has updated a UE availability state;

and wherein the HSS is further configured to send an update location acknowledgment to the terrestrial MME;

and wherein the UE is further configured to:

transmit packets to the satellite base station through a satellite using the satellite attach context and the satellite network operational data set, and the UE transmits packets to the terrestrial base station using a terrestrial attach context and the terrestrial network operation data set; and wherein the satellite core network is further configured to:

receive the packets from the UE using the first subset of the attach context.

15. The method of claim 1, further comprising maintaining, by the satellite core network, an availability state of UE and in absence of a detach request message from the UE.

16. The method of claim 1, further comprising receiving, by the satellite core network, a detach request from the UE, wherein the satellite core network does not send a detach accept message to the UE, and the UE does not retransmit the detach request when the UE does not receive the detach accept message from satellite core network.

17. The method of claim 1, wherein the satellite core network, the terrestrial core network, the satellite base station, or the terrestrial base station maintain various states, including a context availability state, an EMM ((EPS (Electrical Power System)) Mobility management)) registration state, an ECM (EPS connectivity management) connection state, and an RRC (Radio Resource Control) connectivity state, wherein the RRC connection states indicate a state of radio resource control connection between satellite base station and UE, wherein the ECM connection state and EMM registration state are maintained by the satellite core network, wherein an ECM Idle state indicates that the satellite attach context for the UE for connection between the satellite base station and satellite core network is not established, and the ECM connected state indicates that the satellite attach context of the UE for connection between the satellite base station and the satellite core network is established.

18. The method of claim 1, wherein availability of first and second subsets of attach contexts indicates that the UE has already completed Authentication and NAS (Non Access Stratum) Security procedures.

19. The method of claim 1, further comprising purging by the satellite core network the first subset of the attach context based on the UE operational data set.

20. The method of claim 1, wherein the satellite network further comprises a joint core network that includes the satellite core network and the terrestrial core network, and further comprising:

sending, by the joint core network, an 'attach accept' message along with network parameters, policies and timer values for both a terrestrial RAT (radio access technology) of the terrestrial base station and a satellite RAT (radio access technology) of the satellite base station;

wherein the UE saves terrestrial parameters along with a terrestrial network operational data set and satellite related parameters with a satellite network operational dataset; and routing, by the joint core network, downlink messages either to the terrestrial RAT of the terrestrial base station or the satellite RAT of the satellite base station based on the UE availability state.

* * * * *